UNITED STATES PATENT OFFICE 2,557,673

3-SUBSTITUTED DERIVATIVES OF 2,3-DI-HYDROTHIANAPHTHENE-1-DIOXIDE

Wilbur H. McKellin and Frederick G. Bordwell, Evanston, Ill., assignors to The Texas Company, New York, N. Y., a corporation of Delaware No Drawing. Application September 26, 1949, Serial No. 117,937

5 Claims. (Cl. 260—330.5)

This invention relates to the novel compounds derived from thianaphthene-1-dioxide. More specifically, the novel compounds of this invention are addition products of thianaphthene-1-dioxide and aliphatic alcohols, aliphatic mercaptans, aryl mercaptans, water and hydrogen sulfide.

The novel compounds of this invention have the general formula

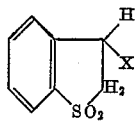

wherein X equals OH, OR, SH, SR and SR'; R is an aliphatic group and R' is an aryl group. These novel compounds are substituted derivatives of 2,3 - dihydrothianaphthene - 1 - dioxide wherein an OH, OR, SH, SR, or SR' has replaced a hydrogen atom in the 3-position.

The novel compounds of this invention are useful as pesticides, pharmaceuticals and as chemical intermediates in the preparation of pesticides, pharmaceuticals and lube oil additives.

The hydroxy and mercapto compounds which can be added to thianaphthene-1-dioxide to form the novel compounds of this invention comprise aliphatic alcohols, aliphatic mercaptans, thiophenols, water and hydrogen sulfide.

The novel compounds of this invention are readily prepared by reacting thianaphthene-1-dioxide with one of the addition agents in alkaline medium. It is advisable to employ an excess of addition agent. The preparation of compounds of this invention is illustrated in the following examples. There is no intention to limit the novel compounds of this invention to any particular mode of preparation.

Example I

A mixture of 2.0 g. of thianaphthene-1-dioxide, 0.1 g. of potassium hydroxide and 50 cc. of ethanol was heated under reflux for 24 hours. On cooling, there precipitated 1.8 g. of crystalline product having a melting point of 103 to 105° C. This amounted to 94 per cent yield of 3-ethoxy-2, 3-dihydrothianaphthene-1-dioxide. On recrystallization from dilute alcohol, the product was obtained in colorless platelets having a melting point of 108 to 109° C. Analysis of this product indicated that it contained 56.80 per cent carbon and 5.68 per cent hydrogen as compared with calculated theoretical values of 56.61 per cent and 5.66 per cent for the elements in the order named. 3-ethoxy-2, 3-dihydrothianaphthene - 1 - dioxide has the following structural formula:

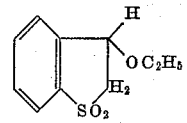

Example II

A mixture of 1.0 g. thianaphthene-1-dioxide, 0.1 g. of potassium hydroxide and 50 cc. of isopropyl alcohol was heated under reflux for 24 hours. Thereafter, the solution was evaporated to dryness with air, and the resulting solid was suspended in water to form a suspension which was filtered. There was obtained 1.25 g. of 3-isopropoxy-2, 3-dihydrothianaphthene - 1 - dioxide which was a yield of 93 per cent. Analysis of a sample recrystallized from dilute alcohol indicated that it contained 58.18 per cent carbon and 6.39 per cent hydrogen as compared with calculated theoretical values of 58.38 per cent and 6.24 per cent for the elements in the order named. The structural formula of 3-isopropoxy-2, 3-dihydrothianaphthene-1-dioxide is as follows:

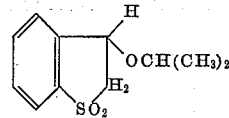

Example III

A mixture of 1.0 g. of thianaphthene-1-dioxide, 0.1 g. potassium hydroxide and 50 cc. of t-butyl alcohol was refluxed for 40 hours. The reaction mixture was evaporated to dryness with a stream of air and the residual solid was taken up in 20 cc. of water to form a suspension which was filtered. On filtration, there was obtained 0.55 g. of 3-t-butoxy-2, 3-dihydrothianaphthene-1-dioxide, melting at 110 to 114° C., which was a yield of 38 per cent. On recrystallization from dilute alcohol, a crystalline product was obtained melting at 115–116° C. Analysis of a purified sample of this product indicated that it contained 60.01 per cent carbon and 6.75 per cent hydrogen as compared with calculated theoretical values of 59.97 per cent, and 6.71 per cent for the elements in the order named. The structural formula for 3-t-butoxy-2, 3-dihydrothianaphthene-1-dioxide is as follows:

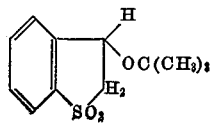

Example IV 5.0 g. of thianaphthene-1-dioxide was added to 150 cc. of 1.0 normal sodium hydroxide solution and the resulting mixture was stirred at room temperature for six days, at which time all of the suspended solid had dissolved. The reaction mixture was then acidified with dilute hydrochloric acid and evaporated to dryness with air. The residue was extracted with dry acetone; a clear yellow oil was obtained on evaporation of the acetone extract. There was obtained a quantitative yield of 3-hydroxy-2,3-dihydrothianaphthene-1-dioxide whose structural formula is as follows:

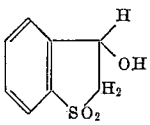

The crude 3 - hydroxy - 2,3 - dihydrothianaphthene-1-dioxide was treated with acetyl chloride to yield, after evaporating excess acetyl chloride, a crystalline material melted at 87 to 97° C. The crude 3-acetoxy-2,3-dihydrothianaphthene-1- dioxide was recrystallized from dilute alcohol to yield a product melting at 89.5 to 90° C. Analysis of the acetoxy derivative indicated that it contained 52.88 per cent carbon and 4.55 per cent hydrogen as compared with calculated theoretical values of 53.08 per cent and 4.46 per cent for the elements in the order named. The benzoxy derivative was prepared by treating 0.5 gram of 3-hydroxy - 2,3 - dihydrothianaphthene - 1 - dioxide with 5.0 grams of benzoyl chloride. After reflux for twenty minutes, the mixture was cooled and made strongly alkaline with sodium hydroxide. The separated oil formed a solid which melted at 100 to 105° C. On recrystallization from dilute alcohol there was obtained 3-benzoxy-2,3-dihydrothianaphthene-1-dioxide, melting at 107 to 108° C. An analysis of this benzoxy derivative indicated that it contained 62.80 per cent carbon and 4.28 per cent hydrogen as compared with calculated theoretical values of 62.48 per cent and 4.20 per cent for the elements in the order named.

Example V 1.33 g. of thiophenol in 25 cc. of dry benzene was added to 0.14 g. of sodium sand suspended in 50 cc. of dry benzene, and the resulting mixture was refluxed for 4 hours. 1.0 g. of thianaphthene-1-dioxide was added to the cooled mixture and the entire mixture was then refluxed for another 20 hours. 100 cc. of water was added to the cooled reaction mixture; the benzene layer was separated and washed with 10 per cent sodium hydroxide solution and then with water. Upon evaporation of the benzene layer, there was obtained 1.65 g., a quantitative yield, of 3-thiophenoxy - 2,3 - dihydrothianaphthene - 1 - dioxide. On recrystallization from alcohol there was obtained a product melting at 69–70° C. Analysis of the product obtained in this fashion indicated that it contained 61.12 per cent carbon, and 4.38 per cent hydrogen as compared with calculated theoretical values of 60.84 per cent and 4.38 per cent for the elements in the order named. 3 - thiophenyl - 2,3 - dihydrothianaphthene - 1 - dioxide has the following structural formula:

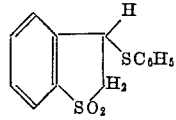

The foregoing examples illustrate the mode of preparation and properties of characteristic members of the novel compounds of this invention. It will be understood that other preparative procedures may be employed to prepare the novel compounds of this invention. Moreover, aliphatic alcohols, aliphatic mercaptans, and aryl mercaptans other than those illustrated may be combined with thianaphthene-1-dioxide to give novel derivatives thereof.

Obviously, many modifications and variations of the invention, as hereinbefore set forth, may be made without departing from the spirit and scope thereof, and, therefore, only such limitations should be imposed as are indicated in the appended claims.

We claim:

1. Substituted 2,3-dihydrothianaphthene-1-dioxide having the following general formula:

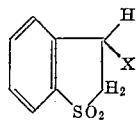

wherein X is OH, SH, OR, SR, SR' with R being an aliphatic hydrocarbon radical and R' an aryl hydrocarbon radical.

2. 3 - alkoxy - 2,3 - dihydrothianaphthene - 1 - dioxide.

3. 3 - hydroxy - 2,3 - dihydrothianaphthene - 1-dioxide.

4. 3-aryl hydrocarbon mercapto-2,3-dihydrothianaphthene-1-dioxide.

5. 3 - thiophenyl - 2,3 - dihydrothianaphthene-1-dioxide.

WILBUR H. McKELLIN.
FREDERICK G. BORDWELL.

REFERENCES CITED

The following references are of record in the file of this patent:

UNITED STATES PATENTS

| Number | Name | Date |
| --- | --- | --- |
| 1,913,484 | Haller | June 13, 1933 |
| 2,482,631 | Morris | Sept. 20, 1949 |